United States Patent [19]

Shingu et al.

[11] Patent Number: 4,963,809
[45] Date of Patent: Oct. 16, 1990

[54] LINEAR STEP MOTOR TYPE DRIVING APPARATUS FOR DRIVING A LONGITUDINALLY MOVABLE BODY

[75] Inventors: Meiji Shingu; Eiichi Yonezawa; Hiroshi Fujii, all of Kanagawa, Japan

[73] Assignee: Fuji Electric Co., Ltd., Kanagawa, Japan

[21] Appl. No.: 356,314

[22] Filed: May 24, 1989

[30] Foreign Application Priority Data

May 25, 1988 [JP] Japan .................. 63-127928
Jan. 24, 1989 [JP] Japan .................. 1-14516

[51] Int. Cl.$^5$ ............................ H02P 8/00
[52] U.S. Cl. ............................ 318/696; 318/685
[58] Field of Search ............ 318/696, 685, 135

[56] References Cited

U.S. PATENT DOCUMENTS 3,457,482  7/1969  Sawyer ................ 318/135

OTHER PUBLICATIONS

"Moving Coil Linear DC Motor for Automatic Automotive Curtain Systems", Developed by the Technology Development Department, Toyota Auto Body Co., Ltd. (1985).

Primary Examiner—William M. Shoop, Jr.
Assistant Examiner—Saul M. Bergmann
Attorney, Agent, or Firm—Finnegan, Henderson, Farabow, Garrett and Dunner

[57] ABSTRACT

A driving assembly for a horizontally-moving vertically-suspended body, for example a curtain, comprises a moving element disposed in a channel of a rail. The moving element is mounted with an electromagnet which receives either discrete pulses or continuous current for an electrical linear step motor. Coils of the electromagnet produce a magnetomotive force operable to cause a row of pole teeth of the magnet to repulse a corresponding opposed scale connected to the channel, thereby moving the moving element in the channel.

8 Claims, 2 Drawing Sheets

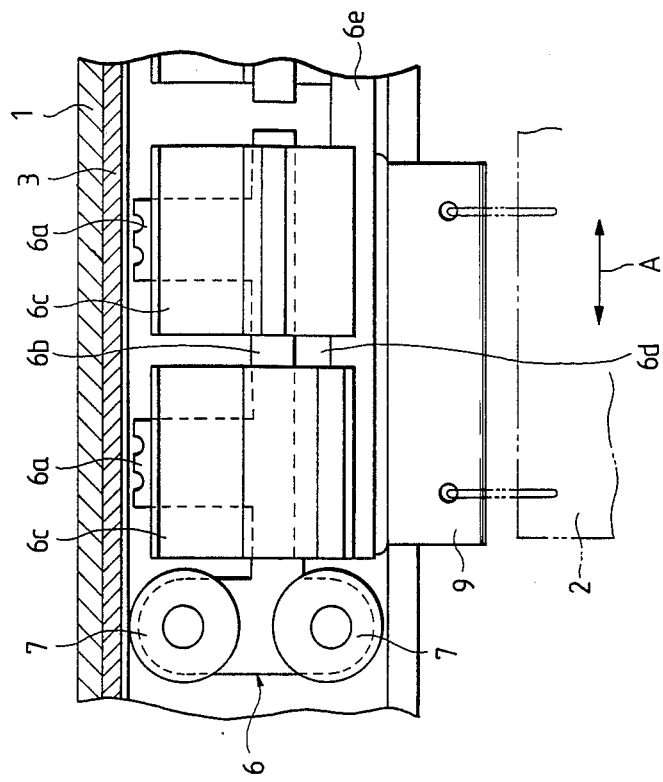
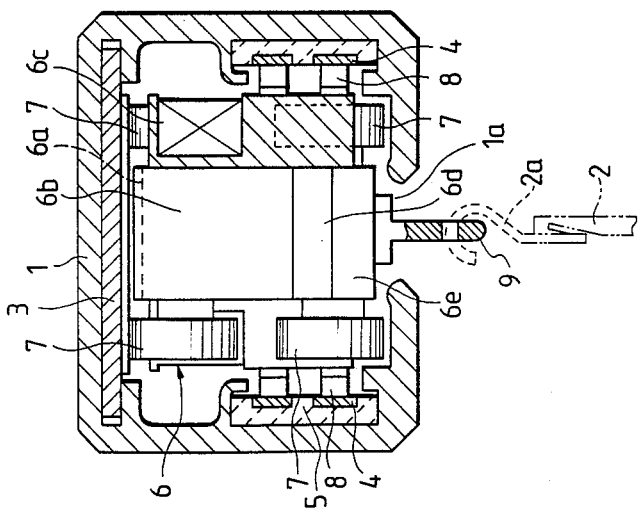

LINEAR STEP MOTOR TYPE DRIVING APPARATUS FOR DRIVING A LONGITUDINALLY MOVABLE BODY

FIELD OF THE INVENTION

The present invention relates to a linear step motor type driving apparatus for use with a horizontally movable body. More specifically, it refers to a linear step motor type driving apparatus for driving an interior curtain, for example, in a hotel guest room, a thick curtain, an accordion door, or the like, in such a manner that the horizontally movable body, supported and suspended by a rail, is opened or closed.

BACKGROUND OF THE INVENTION

A motor-driven curtain rail in which a curtain, such as a curtain of the type referred to above, is opened and closed in accordance with a command from a switch operation or the like, has been known. In such a motor-driven curtain rail, a cable for operating a curtain is incorporated in a curtain rail disposed, e.g., on a ceiling so that that cable is driven by a motor to be fed out or wound on a reel, thereby opening or closing the curtain. Further, a motor-driven curtain rail with use for a very small curtain such as an interior curtain of a car or the like, in which a curtain is directly driven by a linear DC motor incorporated in a curtain rail so as to be opened or closed, has recently been produced and marketed.

In such a conventional motor-driven curtain rail using a cable, however, the whole curtain rail is large and heavy because it is necessary to mount a motor, a cable reel, a braking mechanism, and the like, on a curtain rail body. In the motor-driven curtain rail using a cable, there have been further disadvantages in that maintenance of the cable is troublesome due to faults such as cutting, entanglement, or the like, which are apt to occur in the cable in use. Further, the curtain cannot be freely opened by hand because the curtain is mechanically transmission-coupled with the driving motor through the cable.

In a motor-driven curtain rail utilizing a linear DC motor, on the other hand, the cost of the curtain rail is high because it is necessary to provide expensive permanent magnet elements of, for example, a ferrite material or the like, along the curtain rail over the entire length thereof. Further, there is a functional problem with this curtain rail because a linear DC motor per se has no braking function and the running speed thereof varies in accordance with load fluctuations.

SUMMARY OF THE INVENTION

The present invention has been made to overcome the foregoing problems and an object thereof is to provide a linear step motor type driving apparatus in which a linear step motor is employed as a driver so that a horizontally movable body such as a curtain or the like is directly driven by the motor along a rail so as to be opened or closed.

Further objects of the present invention are to make the driving apparatus small in size, to make the driving apparatus free from maintenance, and to improve the operation of the driving apparatus.

To achieve the foregoing objects, a linear step motor type driving apparatus according to the present invention is constituted by a channel-shaped rail laid along a movement path of a horizontally movable body and a moving element of the linear step motor incorporated in the channel-shaped rail. The channel-shaped rail is provided with a scale of the linear step motor and pulse signal feeders, and the moving element is provided with running rollers, current collection brushes, and a hook for suspending the horizontally movable body.

In order to reduce noises generated as the linear step motor runs, it is preferable to provide an auxiliary roller for holding an air gap on the moving element separately from the running rollers, at an intermediate position between the running rollers and in addition to the running rollers.

In the foregoing apparatus, when an input pulse signal is externally applied to a plurality of coils of the electromagnets of the moving element of the linear step motor through the feeders laid on the rail, the moving element of the linear step motor supported by the running rollers is advanced step by step in the instructed direction along the scale on the rail side at a speed corresponding to a frequency of the input step signal. As is well known, the linear step motor has superior properties, for example a large starting propulsion force, a constant-speed property not affected by fluctuations in load, a magnetic braking force and a freely positioning control property, and a sturdy structure in which faults hardly occur, so that a linear step motor can be used for a long time, almost without maintenance.

A horizontally movable body such as a curtain or the like is suspended and supported by the moving element of the linear step motor, and opened and closed along the rail in the instructed direction in a direct driving manner in accordance with the stepping movement of the linear step motor. In this case, the rail is not always required to be linear. This apparatus can be applied to a curved rail, for example, a rail curved in an S-shape. Further, when the moving element of the linear step motor is stopped, a horizontally movable body can be freely moved by a manual operation along the rail without being subject to any restrictions. That is, curtain or the like can be opened and closed not only by the driving of the linear step motor, but also by a manual operation.

In order to make the magnetic propulsion force of the linear step motor high, on the other hand, it is desirable that the length of an air gap between magnetic poles of the electromagnets of the moving element and the scale provided at the rail side be reduced to be as narrow as possible. Generally, the air gap is designed to have a fine value of about 10 $\mu$m–50 $\mu$m. With such a fine gap, if flexibility of the moving element and the scale is insufficient, flexure is generated between the moving element and the scale by large magnetic attraction force acting therebetween, so that the scale is caused to come into mechanical contact with the pole teeth of the moving element. Besides, the polarity of an input pulse step signal externally applied to the moving element is periodically changed-over, so that flexural oscillations may be caused in the whole linear step motor and the moving element may contact the scale provided at the rail side. This generates noises while running the linear step motor.

According to the present invention, however, an auxiliary roller is additionally attached on the moving element of the linear step motor at the center of the moving element body separated from the running rollers provided at the front and rear ends of the moving element body. This improves the support of the moving element with respect to the rail from two-point support at the front and rear to three-point support at the front, rear, and center so that the supporting span between the rollers is reduced to half. Therefore, in accordance with the present invention, the amplitude of flexure due to the magnetic attraction force between the scale and the moving element is reduced to be about ¼ compared with the flexural amplitude in the case where no auxiliary roller is provided, under the same condition of rigidity of the scale and the moving element of the linear step motor. Hence, even if the air gap length is set to a fine value, as described above, the mechanical contact between the scale provided at the rail side and the poleface of the moving element due to the magnetic attraction force is prevented, and the generation of noises as the linear step motor runs can be considerably reduced.

BRIEF DESCRIPTION OF THE DRAWINGS

FIG. 1 is a front view showing an embodiment of the present invention which is applied to a curtain rail;

FIG. 2 is a side view showing an embodiment of the present invention which is applied to a curtain rail;

DESCRIPTION OF THE PREFERRED EMBODIMENTS

Figure 3:
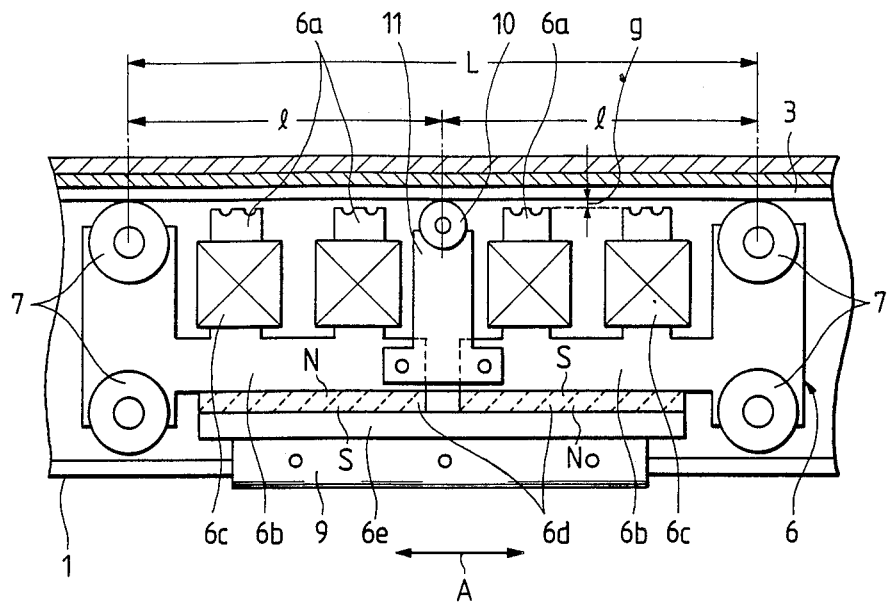
FIG. 3 is a side view showing a modification of the present invention in which an auxiliary roller is attached to the moving element of the linear step motor.

FIGS. 1 and 2 show an embodiment of the present invention where the invention is applied to a curtain rail of an interior curtain. In the drawings, a rail 1 is laid on the ceiling along an opening/closing movement path of a curtain 2. The rail 1 is channel-shaped so as to have a square section and to have a longitudinally-opened slit 1a formed in the lower central surface of the rail 1. A scale 3 of a linear step motor constituted by a magnetic plate having a row of teeth or holes formed at a predetermined pitch is laid on the center of the ceiling surface of the rail 1 along the longitudinal direction of the rail 1, and feeders 4 for feeding an input step signal are laid through insulators 5 respectively on the right and left side surfaces of the rail 1.

A moving element 6 of the linear step motor is also incorporated in rail 1. The moving element 6 is constituted by a pair of electromagnets (in the drawings, only one electromagnet is illustrated and the other electromagnet is omitted) disposed side by side at the front and rear and each constituted by a U-shaped core 6b wtih their pole teeth 6a faced to the scale 3 through an air gap and exciting coils 6c wound around the leg portions of the core 6b; a permanent magnet 6d coupled to the core 6b at the sides thereof; and a yoke 6e provided on a back side of the permanent magnet 6d so as to cross the pair of electromagnets to act as a coupler. Further, two pairs of running rollers 7 which rotate while abutting on the upper and lower rail surfaces of the channel-shaped rail 1 are provided, respectively, at the front and rear ends of the moving element (in the drawings, only the running rollers provided at one end of the moving element are illustrated). Current collection brushes 8 which slide on the feeders 4 are provided on the right and left side surfaces of the moving element, and a suspending hook 9 for the purpose of suspension is attached on the lower surface of the moving element so as to be projected toward the lower surface of the channel-shaped rail 1 through the slit 1a of the rail 1. As the current collection brush 8, not only a generally-used carbon brush, but a brush using an electrically conductive magnetic fluid and having hardly any frictional resistance may be employed.

The curtain 2 is suspended and supported at its front end portion by a suspending hook 9 through L-shaped curtain hooks 2a, with moving element 6 of the linear pulse motor made to be a head vehicle of curtain 2. The succeeding guide rollers suspending the middle portion of the curtain 2 are movable incorporated in the rail 1.

In the above-described apparatus, when an input step signal is externally applied to the exciting coils 6c of the moving element 6 through the feeders 4 and the current collection brushes 8, the magnetic flux of the exciting coils 6c acts on the magnetic flux of the permanent magnet 6d. This generates an electromagnetic propulsion force between the moving element 6 and the scale 3, so that the moving element 6 is caused to move step by step along the scale 3 on the rail side through the running rollers 7 in the direction corresponding to the direction of current conduction and at a speed corresponding to the frequency pulse of the signal. If the feeding of the input pulse signal is stopped, a braking force created by the magnetic attraction force between the permanent magnet 6d and the scale 3 acts to thereby stop moving element 6 at the position thereof at that moment. Being well known, the principle of operation of the foregoing permanent magnet-type linear step motor need not be described here in detail.

Thus, the curtain 2, suspended and supported by the moving element 6, is moved together with the moving element 6 so as to be opened or closed along the rail 1 in the direction of an arrow A in FIG. 2 by the stepping movement of the linear step motor. With respect to the foregoing running rollers 7, the upper running rollers are caused to abut on the upper rail surface of the rail 1 by the magnetic attraction force between the scale 3 and the moving element 6 to thereby hold an air gap between the scale 3 and the pole teeth 6a of the moving element 6 in the running state of the linear step motor. On the other hand, the lower running rollers naturally abut on the lower rail surface to thereby support the load weight of the linear step motor in the stopping state of the linear step motor. Further, the feeders 4 are provided over the entire length of the rail 1 so that the input pulse signal can be fed through the current collection brushes 8 without hindrance at any location of the moving element 6. Moreover, in the stopping state of the moving element 6 having no input signal, the curtain 2 can be freely opened/closed by a manual operation against magnetic braking force due to the permanent magnet 6b. Further, it is not always necessary to make the rail 1 straight. A curved rail, for example, an S-shaped rail may be used.

Although the embodiment described above illustrates use of a certain rail for an interior curtain, it is to be understood that the present invention can be realized and applied to a driving apparatus for various horizontally movable bodies; other than an interior curtain, for example, a thick curtain, an accordion door, and the like.

Further embodiments of the present invention will be described with reference to FIGS. 3 and 4. First, in FIG. 3, the fundamental structure of the moving element 6 is the same as that in the previous embodiment. In this embodiment, however, in addition to the running rollers 7 provided at the front and rear ends of the moving element 6, an auxiliary roller 10 for holding an air gap is also attached on the moving element 6 at a central portion of the moving element body, that is, at a middle position between the pair of electromagnets arranged side by side along the rail 1, so that the auxiliary roller 10 faces the scale 3. The auxiliary roller 10 is supported by a T-shaped roller support member 11 which is disposed across the cores 6b and fixed thereto by means of bolts or the like. The attachment height of the auxiliary roller 10 is adjusted so that the auxiliary roller 10 abuts on the rail surface of the rail 1 at the same level as that of the running rollers 7 disposed on the front and rear ends of the moving element 6.

Thus, in comparison with the previous embodiment in which only the running rollers 7 are provided at the front and rear ends of the moving element 6, the supporting system of the moving element 6 by means of rollers in changed to provide support at three points, that is, the front, rear and center points, (by the front and rear running rollers 7 and the auxiliary roller 10) in this modification, thus differing from the two-point support (the running rollers 7 at the front and rear ends) in the foregoing embodiment, so that the supporting span l between the rollers is reduced to be ½ of the span L between the running rollers 7. Therefore, under the same condition of flexibility of the scale 3 provided at the rail side and the moving element 6, the flexure due to the magnetic attraction force acting between the scale 3 and the moving element 6 is reduced to about ¼.

Hence, even if the length g of an air gap between the scale 3 and the pole teeth 6a of the moving element 6 is set to be very small, the degree of mechanical contact between the pole teeth 6a of the moving element 6 and the scale 3 while running the linear step motor decreases. Thus, noises due to mechanical contact are considerably reduced. The noise reduction effect has been confirmed by tests run on an actual apparatus.

Figure 4:
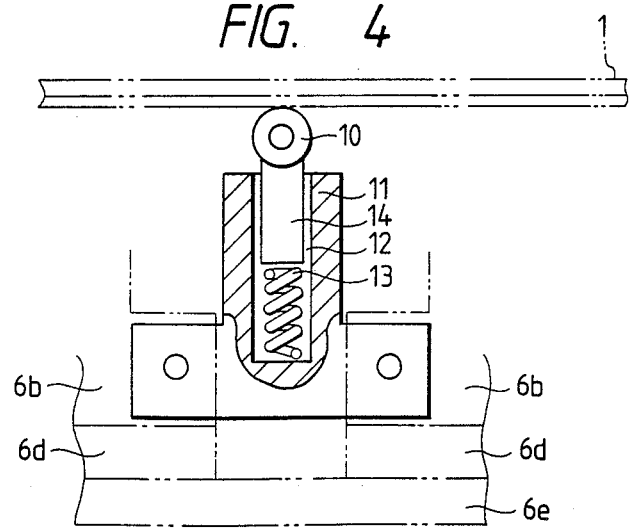
FIG. 4 is a view showing an improved modification as to the attachment structure of an auxiliary roller.

FIG. 4 shows an improved attachment structure of the auxiliary roller 10. In this structure a guide groove 12 is formed in the roller supporting member 11 so that a rod 14 which is attached on the roller shaft of the auxiliary roller 10 is inserted into the groove 12 through a compression spring 13. In this embodiment, it is unnecessary to perform troublesome adjusting work to make the level of the front and rear running rollers 7 coincide with that of the auxiliary roller 10 if the spring pressure of the compression spring 13 is properly adjusted in advance.

As another example of the roller attachment structure, a roller assembly in which the running rollers 7 to be disposed on the front and rear ends of the moving element 6 and the auxiliary roller 10 to be attached at the center of the moving element 6 are rotatably supported on one row on a common supporting frame with their levels adjusted to be even is prepared in advance so that the thus prepared roller assembly can be combined with the moving element 6 by fixing the roller assembly on the right and left side surfaces of the moving element 6.

When constructed as described above, the linear step motor type driving apparatus for moving a horizontally movable body according to the present invention has the following meritorious effects.

The above-described linear step motor type apparatus comprises a channel-shaped rail laid along a movement path of the horizontally movable body and a moving element of the linear step motor incorporated in the channel-shaped rail, the channel-shaped rail being provided with a scale of the linear step motor and pulse signal feeders, and the moving element being provided with running rollers, current collection brushes, and a hook for suspending the horizontally movable body. Thus, the horizontally movable body can be smoothly moved by direct driving with a small-sized or compact driving apparatus in constrast to the conventional cable-type motor-driven driving apparatus. Further, compared with the conventional driving apparatus utilizing a linear DC motor, an apparatus superior in braking function can be realized at a relatively low cost. Moreover, it is possible to provide a linear step motor-type driving apparatus in which a horizontally movable body can be operated by hand without being subject to any restriction in a stopping state of the linear step motor, which is strong, in which a fault hardly occurs, which can be used for a long time almost without requiring maintenance, and which has a general purpose property so that the field of application can be expanded to a curtain and other various horizontal movable bodies.

In the linear step motor-type driving apparatus constructed in accordance with the foregoing description, an auxiliary roller for holding an air gap is provided on the moving element separately from the front and the rear running rollers at an intermediate position between the running rollers. This decreases the supporting span between the rollers of the moving element to thereby suppress the flexure of the scale and the moving element due to the magnetic attraction force, so that the degree of mechanical contact between the moving element and the scale is suppressed to thereby considerably reduce generation of noises.

Having described preferred embodiments of the present invention, it is to be understood that variation and modification thereof falling within the spirit and scope of the appended claims may become apparent to those skilled in the art.

What is claimed is:

1. An assembly for driving a vertically suspended body, comprising:
   rail means defining an elongated channel having an upper portion, vertical side portions, and separated opposing lower portions, for longitudinal movement of the body;
   motor means for moving the body longitudinally in a selected direction in said elongated channel, including a scale disposed in said upper portion of said channel, current supply means for supplying electric current disposed in said side portions of said channel, a moving armature element configured and disposed to move in said channel, having an upper portion, a lower portion and opposite side portions, said moving armature element including an electromagnet having a core, a coil, and a plurality of pole teeth opposing said scale forming the upper portion of said moving armature element, a permanent magnet adjacent said electromagnet, and current collecting brushes electrically connected to said electromagnet, projecting from said side portions of said moving armature element in opposing contact with said current supply means; and
   roller means abutting said upper and lower portions of said channel for rollingly supporting said moving armature element and defining a gap between said pole teeth and said scale.

2. The assembly of claim 1 wherein said moving armature element includes a hook extending from the lower portion of the moving armature element operative to suspend the body.

3. The assembly of claim 1 wherein the gap between said pole teeth and said scale is between 10 μm and 50 μm.

4. The assembly of claim 1, wherein said roller means further includes auxiliary roller means disposed on the upper portion of said moving armature element rotatably abutting said upper portion of said channel for maintaining said gap.

5. The assembly of claim 1, wherein said current supply means supplies discrete electric current pulses for step movement of the body.

6. The assembly of claim 1, wherein said current supply means supplies continuous electric current for continuous movement of the body.

7. The assembly of claim 1, wherein the direction of longitudinal movement of the body is determined by a direction of electric current flow through said current supply means and said motor means.

8. The assembly of claim 4, wherein said auxiliary roller means includes a roller and spring-loaded connection means for connection the roller to said moving armature element.

* * * * *